(12) United States Patent
Chapin et al.

(10) Patent No.: US 7,136,174 B2
(45) Date of Patent: Nov. 14, 2006

(54) SYSTEM FOR INSTALLING A PRINTER DRIVER ON A NETWORK

(75) Inventors: David M. Chapin, Gresham, OR (US); Jonathan A. Edmonds, Silverton, OR (US); Mark L. Hanson, Battle Ground, WA (US); Patrick K. Sheehan, Clackamas, OR (US)

(73) Assignee: Xerox Corporation, Stamford, CT (US)

( * ) Notice: Subject to any disclaimer, the term of this patent is extended or adjusted under 35 U.S.C. 154(b) by 918 days.

(21) Appl. No.: 10/082,980

(22) Filed: Feb. 25, 2002

(65) Prior Publication Data
US 2003/0160988 A1   Aug. 28, 2003

(51) Int. Cl.
*G06F 3/12* (2006.01)
*G06K 15/00* (2006.01)
*G06K 1/00* (2006.01)

(52) U.S. Cl. ..................... 358/1.13; 358/1.15
(58) Field of Classification Search ............. 358/1.9, 358/1.15, 3.24, 1.14, 1.13, 1.1, 437, 438, 358/439; 710/7–12; 709/31–34, 223–232
See application file for complete search history.

(56) References Cited

U.S. PATENT DOCUMENTS

| | | | |
|---|---|---|---|
| 5,924,802 A | 7/1999 | Sakurai | 400/61 |
| 6,519,049 B1 * | 2/2003 | Nagasaka | 358/1.15 |
| 6,823,526 B1 * | 11/2004 | Howard et al. | 719/327 |
| 7,100,169 B1 * | 8/2006 | Carney et al. | 719/321 |
| 2002/0097421 A1 * | 7/2002 | Lomas et al. | 358/1.14 |
| 2003/0030664 A1 * | 2/2003 | Parry | 345/744 |
| 2003/0160989 A1 | 8/2003 | Chapin et al. | |

FOREIGN PATENT DOCUMENTS

EP   1 022 652 A2   7/2000

\* cited by examiner

*Primary Examiner*—Douglas Q. Tran
(74) *Attorney, Agent, or Firm*—Jeanette Walder

(57) ABSTRACT

A system for installing a printer driver for a printer connected on a network includes a printer driver for the printer; an installer, located on a host device connected on the network, responsive to activation, for listening for the printer's identification, and responsive to receipt of the printer's identification, for installing the printer driver on the host device; and a beacon, located at the printer, responsive to an input, for broadcasting the printer's identification on the network.

10 Claims, 8 Drawing Sheets

SYSTEM FOR INSTALLING A PRINTER DRIVER ON A NETWORK

FIELD OF THE INVENTION

This invention relates generally to network printers and more particularly to a system for installing a printer driver on a network.

BACKGROUND OF THE INVENTION

Printers designed for use in a network environment offer greater functionality than the simple desktop printer. In addition to offering more printing and post-print options (collation, binding, etc.), network printers frequently come with built-in processors, hard drives for data storage, a web server for communicating on a network and sophisticated management software. For example, on certain Xerox brand network printers, CentreWare Internet Services provides a built-in web server and management software. Once the printer is physically connected to a network, such as an intranet, it can be managed directly from a standard web browser (such as Netscape 6.02, Internet Explorer 5.0, etc.) or any web-enabled application. This management software enables administrators to monitor, configure, and troubleshoot network printers from a web browser or a web enabled application. This management software also provides hotlinks to product information, software drivers, help-desk and customer support.

Once a printer is physically connected to a network, a user on the network must install a printer driver so that the user can send print jobs to the printer. In a networked print environment, installing a printer can be a troublesome task. Many installation programs search the network for all printers that match the one the user is trying to install. Printers with embedded web servers and hard disks can provide access to the printer driver installer through the printer's embedded web server. However, when the installer program is run from the printer, the installer program still searches for all printers of the selected type, since it does not know which printer it was run from. The installation program presents the user with a list of all printers of the particular type. The user must then pick out which printer it wants to install. This proves to be tedious for the user, since the list presented contains information not easily understood by the user, such as IP addresses or technical nomenclature established by the network administrator.

SUMMARY OF THE INVENTION

A system for installing a printer driver according to one aspect of the invention removes the question of which printer to install by storing information about the printer to be installed, and the source of the data (e.g., the printer driver) to be used to install the printer on the user's host device (which may be a personal computer). When a user connects to a networked printer over a web browser, and browses to the printer driver installer, the printer stores the printer's identification information (including address and/or name) on the user's computer. Once the printer driver installer is launched, it searches the user's computer for the stored data and uses that data to identify and install the desired printer.

A system for installing a printer driver for a printer connected on a network, includes a link for accessing an installation program, wherein the link is displayed in a host device (such as a personal computer) connected on the network in a web page generated by a web server resident on the printer; a printer driver for the printer; an identifier for uniquely identifying the printer on the network, wherein, responsive to activating the link, the identifier stores the printer's unique identification on the host device; and an installer, responsive to activating the link and to receipt of the printer's unique identification, for installing the printer driver on the host device. In one embodiment, the identifier writes the printer's unique identification information in a cookie, which contains the printer's address and/or name on the network. The printer to be installed may or may not contain the printer driver. If the printer driver for the printer to be installed is located elsewhere on the network (or on another network such as the Internet), the identifier also stores the location (such as address and/or name) of the printer driver on the host device.

A system for installing a printer driver according to another aspect of the invention removes the ambiguity of multiple printers on a network by allowing the user to make a physical connection instead of a logical connection. When a user executes an installer on the host device to install a the printer driver, the installer listens to the network for a broadcast from the printer. The user is instructed to go to the printer the user wants to install and activate the printer component of the installation from the printer's front panel. The printer component may be implemented in the form of a beacon which, responsive to an input (such as a user pressing a button at the printer's control panel), broadcasts certain predetermined information about the printer. When the user activates the beacon at the printer, the printer broadcasts its network information. This information may include the printer's model name and distinguishing network information. This information may be broadcast to all devices on the printer's subnet as well as other subnets that the printer knows about. Once the information sent out is received on the host device, the installer knows precisely which printer to select, and continues the installation automatically. When the user activates the beacon at the printer, besides sending out a broadcast the printer also toggle an internal memory flag that a host device installer may query while searching all printers on the network and identify the printer.

In accordance with another embodiment of the invention, a system for installing a printer driver for a printer connected on a network, includes a printer driver for the printer; an installer, located on a host device connected on the network, responsive to activation, for listening for the printer's identification, and responsive to receipt of the printer's identification, for installing the printer driver on the host device; and a beacon, located at the printer, responsive to an input, for broadcasting the printer's identification on the network. The beacon is located at the printer and may be implemented as software stored in the printer's firmware, such as the network code region of the firmware. The beacon broadcasts information on the network using whatever protocol is used by the network it is connected to, such as TCP/IP. The installer may be downloaded from a storage media, such as CD-ROM, or from a location on the network, onto the host device. Alternatively, the installer may be downloaded using a link in a web page generated by a web server (such as from another printer) on the network.

DETAILED DESCRIPTION OF THE EMBODIMENTS

Figure 1:
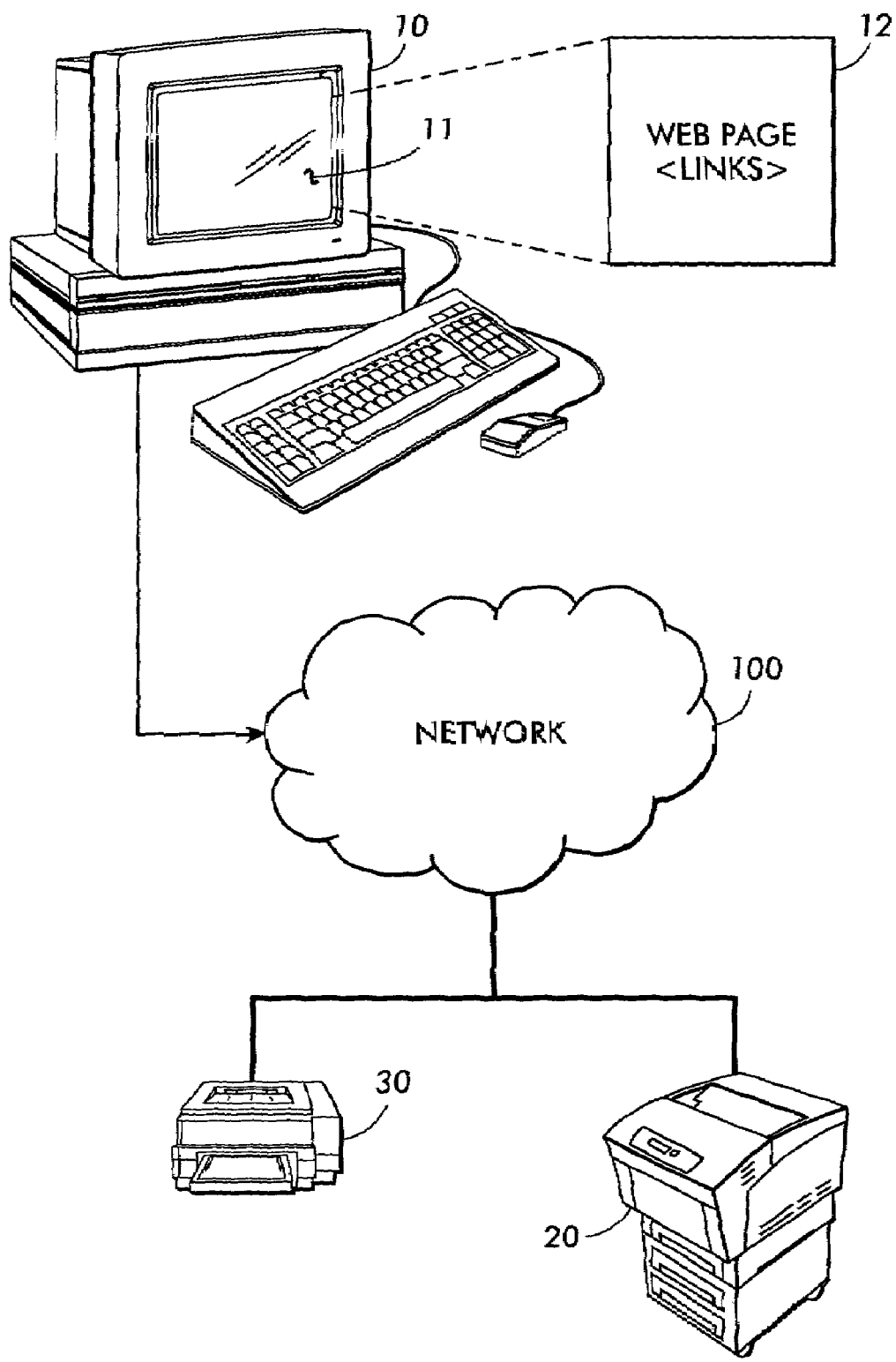
FIG. 1 is a block diagram showing a system of installing a networked printer.

Referring to FIG. 1, a system for installing a networked printer allows a user to browse to a printer's embedded web server and automatically install the correct printer driver for that printer on to the user's computer. Referring to FIG. 1, suppose a user at host device 10, which may be a personal computer, which is connected to network 100, which may be an intranet or the Internet, wishes to install a printer 20, which is already on the network 100. By install, we mean the user wants to be able to send print jobs to printer 20 from the user's host device 10. In order to do this, the user must install the printer's driver onto host device 10.

Printer 20 is of the type which contains a built-in web server, such as for example, the Xerox CentreWare Internet Services. However, any other built-in web server which enables the printer to be managed from a standard web browser or any web-enabled management application may be used. Web servers may be embedded in the printer's firmware, or if the printer has a hard disk, stored on the hard disk. The user opens any standard Internet browser, such as Internet Explorer or Netscape, on host device 10. The user browses to the printer's web page at the user's personal computer or work station, i.e., the user's browser locates the desired printer on the network. This is accomplished using any standard network protocol such as a TCP/IP connection. The TCP/IP connection may pass through a network router from the user's host device 10 to the printer 20.

Figure 2:
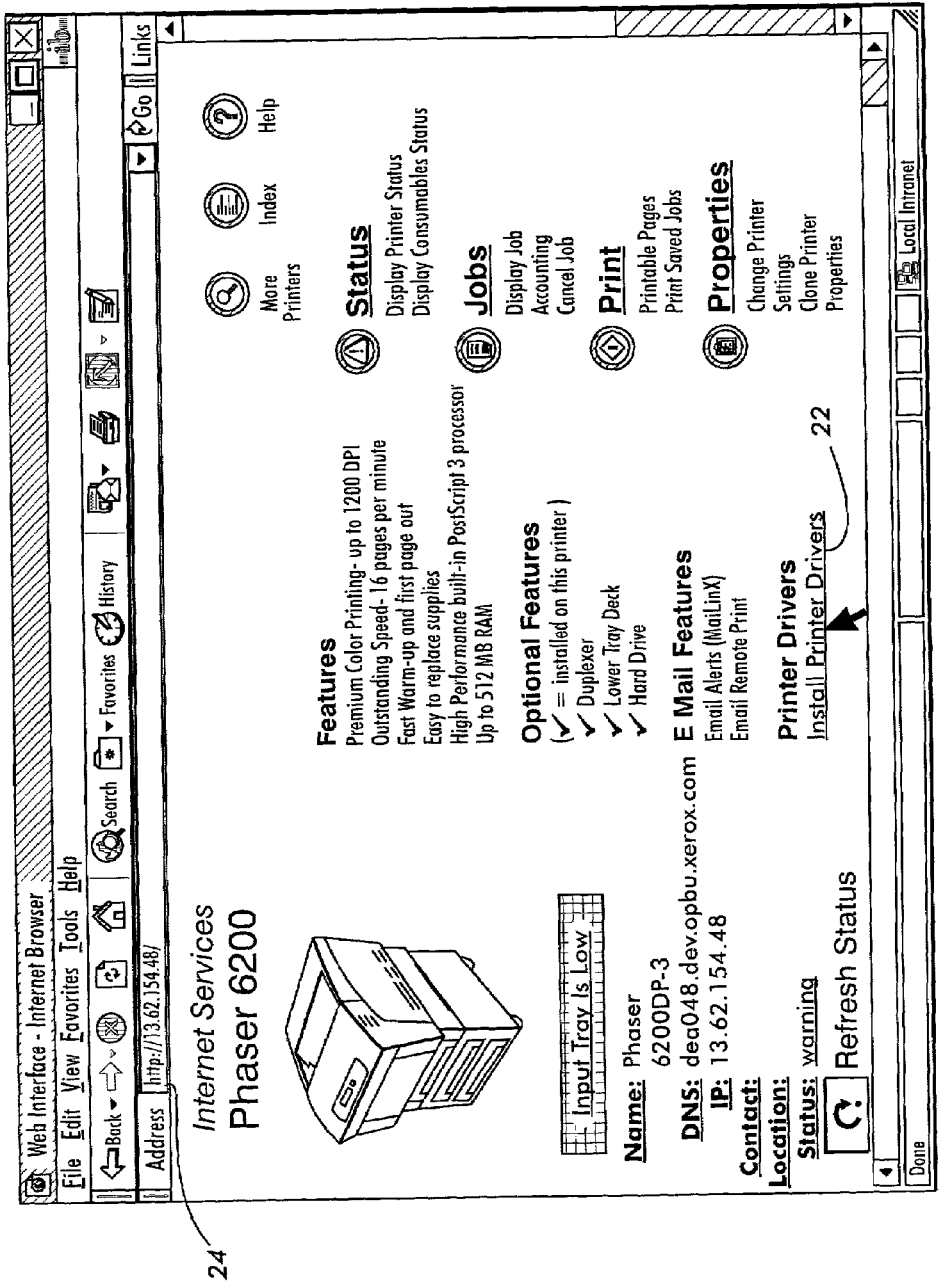
FIG. 2 is a screen shot of a web page, which appears when a user browses to the home page of a printer to be installed.

The printer's web page 12 is displayed in the user's browser. An example of a printer's web page 12 is shown in FIG. 2. The printer's IP address in shown at address 24. From the web page, the user selects the link <Install Printer Drivers>. Selection is made by clicking on the hypertext link to install a printer driver.

Figure 3:
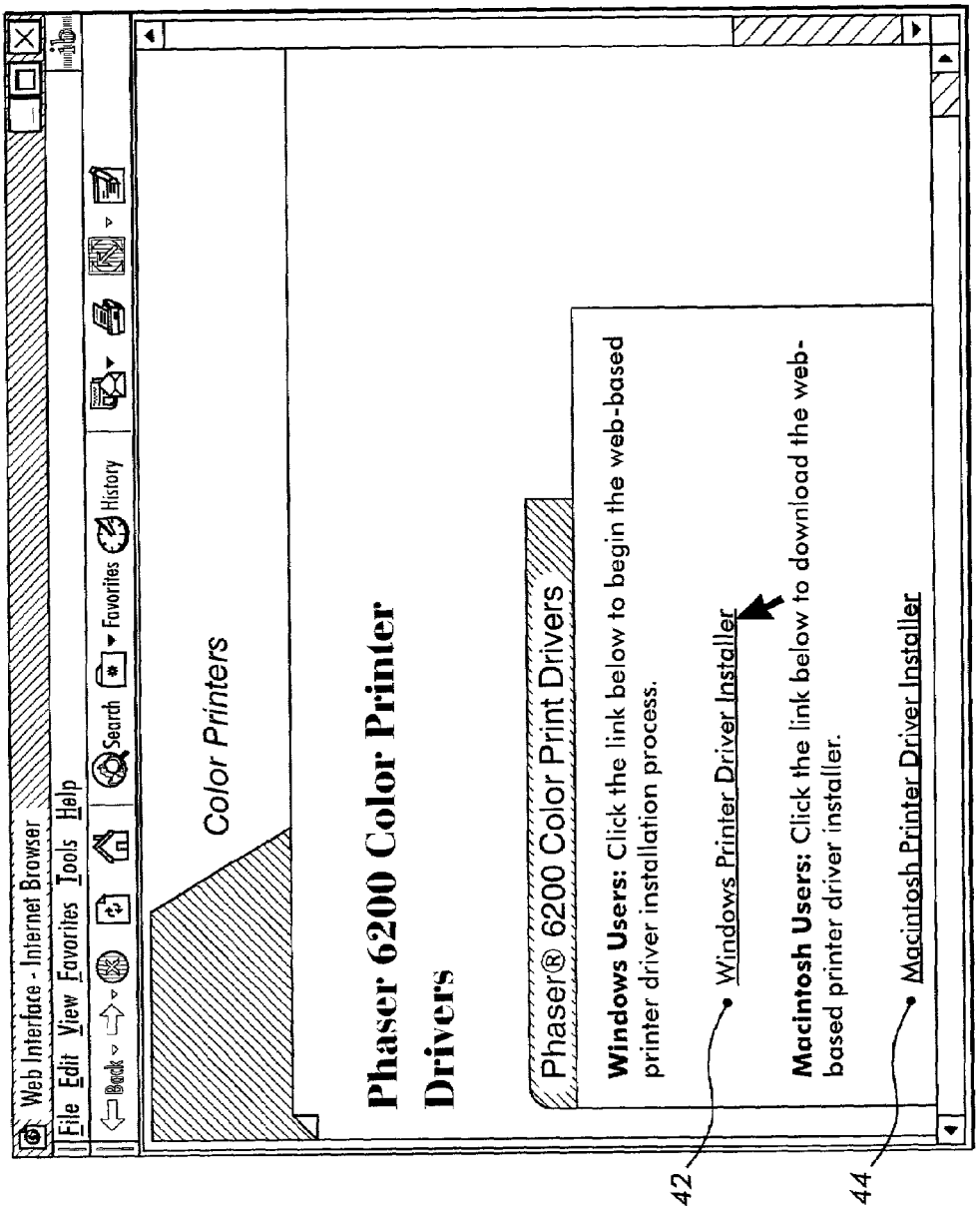
FIG. 3 is a screen shot of a web page, which prompts a user to install a printer driver installer.

A screen shot of the web page which appears after the user clicks on the link <Install Printer Drivers> is shown in FIG. 3. This web page prompts the user to select the particular printer driver to be installed. In this case, two versions of the Phaser 6200 driver are available: a <Windows Printer Driver Installer> link 42 and a <MacIntosh Printer Driver Installer> link 44.

When the user clicks on the <Windows Printer Driver Installer> link 42, the printer 20 causes its web browser to store the printer's IP address on the user's computer. This may be accomplished by firmware in the printer 20 which, in response to activation of the <Install Printer Drivers> link, writes a cookie on the user's host device 10. The cookie contains the IP address of the printer 20 and may also contain other information. For example, if the printer 20 does not contain its printer driver, the installer will need to obtain the printer driver (or other installation files) from a different location. Printer 20 may not have sufficient memory to store its printer driver (if it does not have a hard disk, for example), or a more recent, updated version of the printer driver may be released, but not stored on printer 20. In this case, the cookie may contain the address of the data source for the printer driver or other installation files required. The printer driver and other installation information may be located at another printer, such as printer 30, or another web site on the network 100 (or on another network, such as the Internet). When the cookie is received, this information will also be stored on the user's host device 10.

Figure 4:
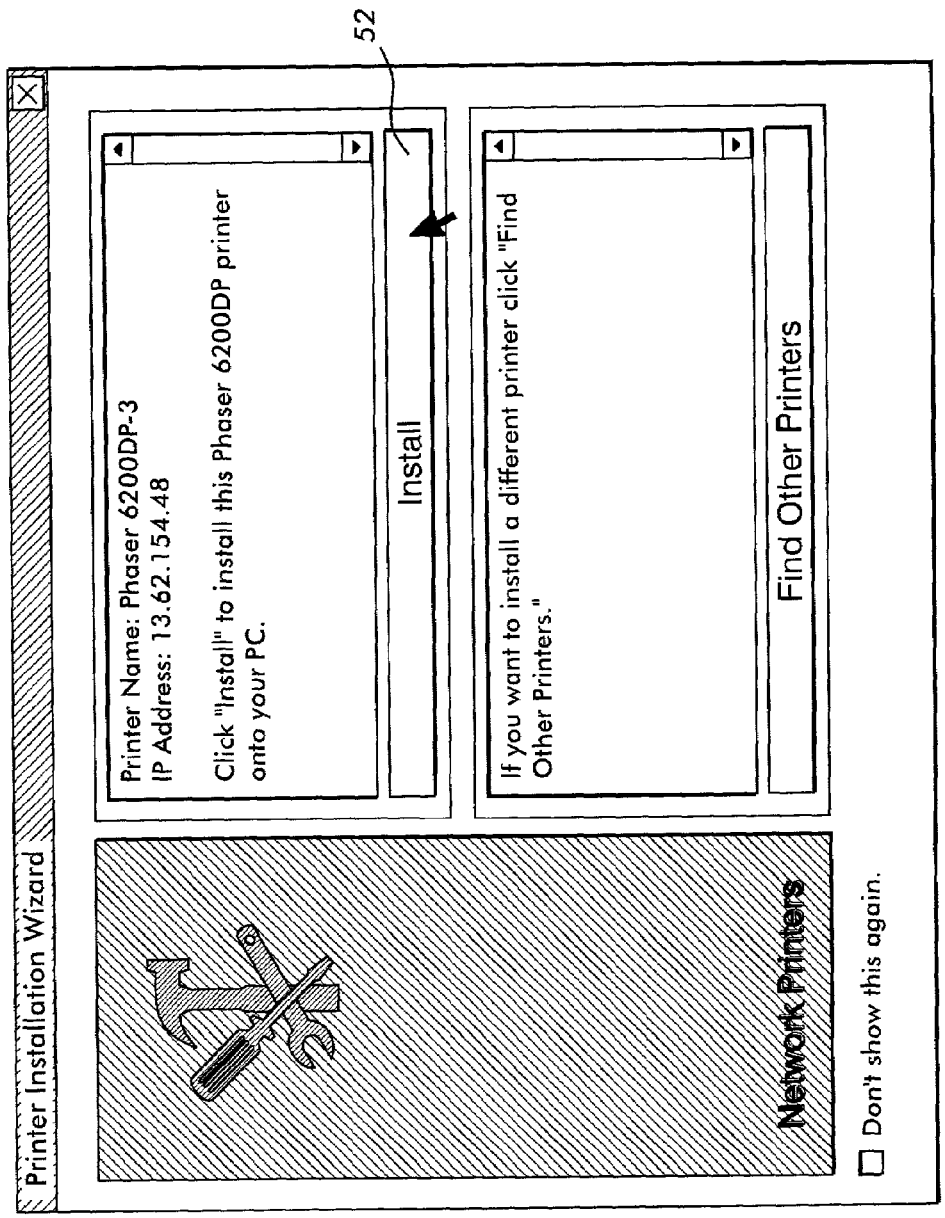
FIG. 4 is a screen shot of a dialog box, which appears after a user clicks on the <Windows Printer Driver Installer> link on the web page shown in FIG. 3.
Figure 5:
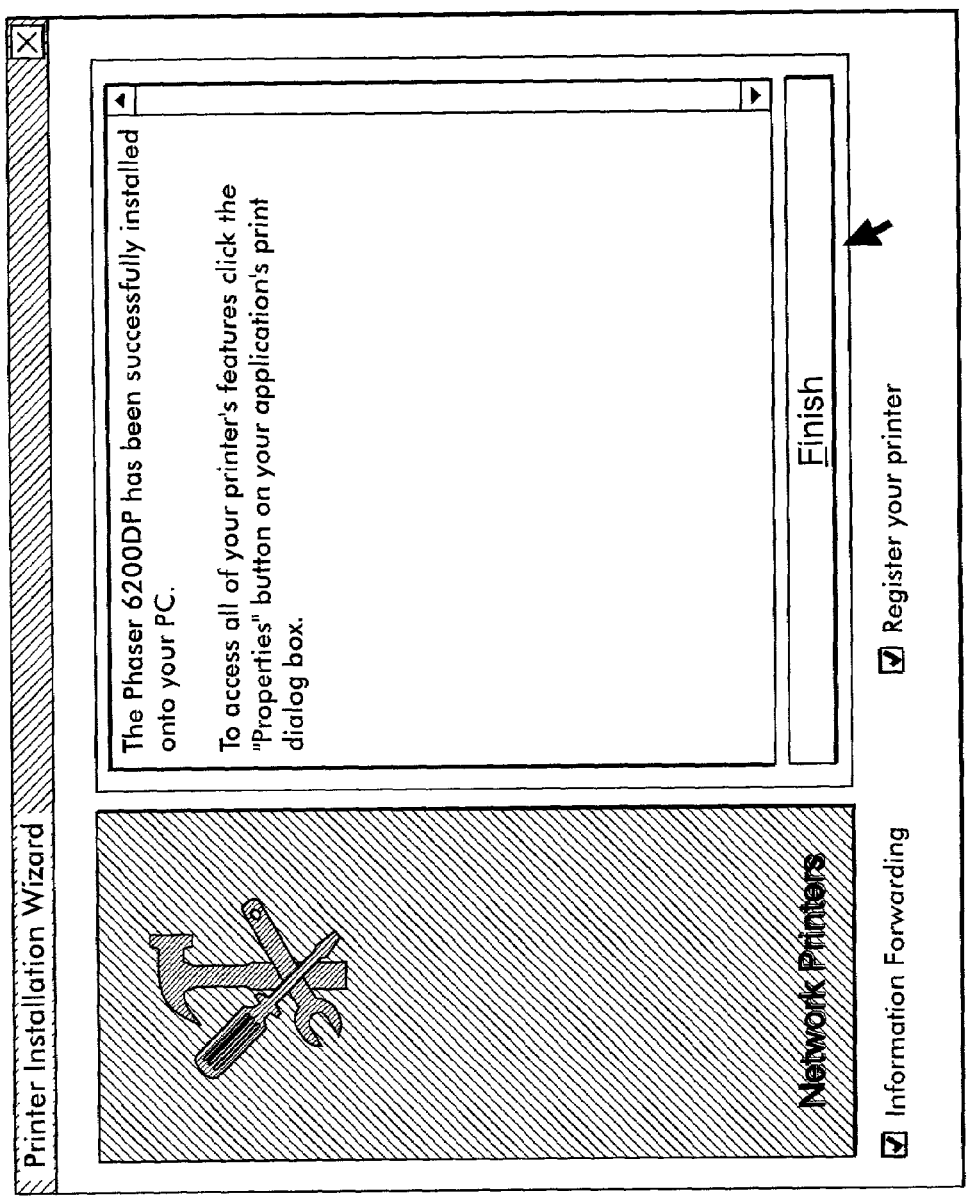
FIG. 5 is a screen shot of a dialog box, which appears after the user, clicks the <Install> link on the dialog box shown in FIG. 4.

After the printer 20's IP address is stored at the user host device 10, the printer's web server runs the installation program on the host device. The installation program screen shown in FIG. 4 is the first screen the installation program presents. This screen displays the printer 20's IP address and asks the user to confirm installation of the printer driver. If the user confirms by clicking on install link 52, the installer files are downloaded from either printer 20 (if they are located there) or the other location of the printer driver files. The installer uses the driver data source address to automatically download the correct driver files from the data source. The installer uses the printer's address to install the printer on the user's host device 10. When a correctly configured printer driver is installed on the user's host device, the web page shown in FIG. 5 is displayed. This system simplifies installation and/or selection of a printer in a multiple printer-networked environment.

In some instances, a user may not be sure if the web page displayed in the user's browser is really the web page of the printer the user wishes to install. A system for installing a printer driver for a printer connected on a network, according to another embodiment, provides a link between the ambiguous networked printer world and the physical connection users are accustomed to with USB and parallel printers (such as when a user is connecting a desktop printer directly to the user's personal computer). Each printer in the network includes a beacon, which when activated identifies the printer the user wants to install. When the host device receives the beacon broadcast, the installer installs the correct printer driver on the user's personal computer. The beacon may be activated at the printer by accessing a special menu on the printer's display panel. Once the beacon is activated, the printer broadcasts a data packet on the network. This packet contains enough distinguishing information such that the host device knows which printer sent it and can proceed with installation of that printer.

Figure 6:
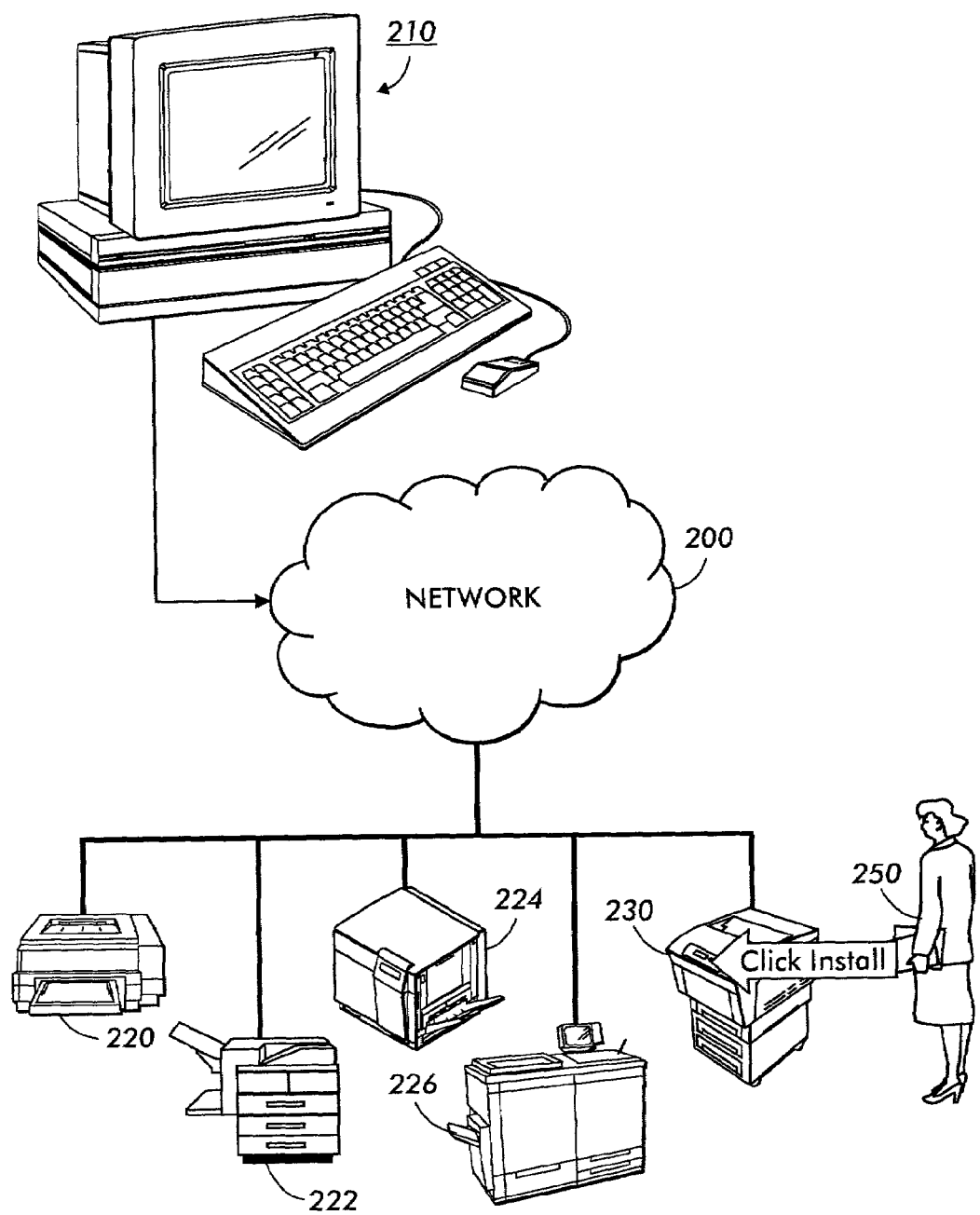
FIG. 6 is a block diagram showing another system of installing a networked printer.
Figure 7:
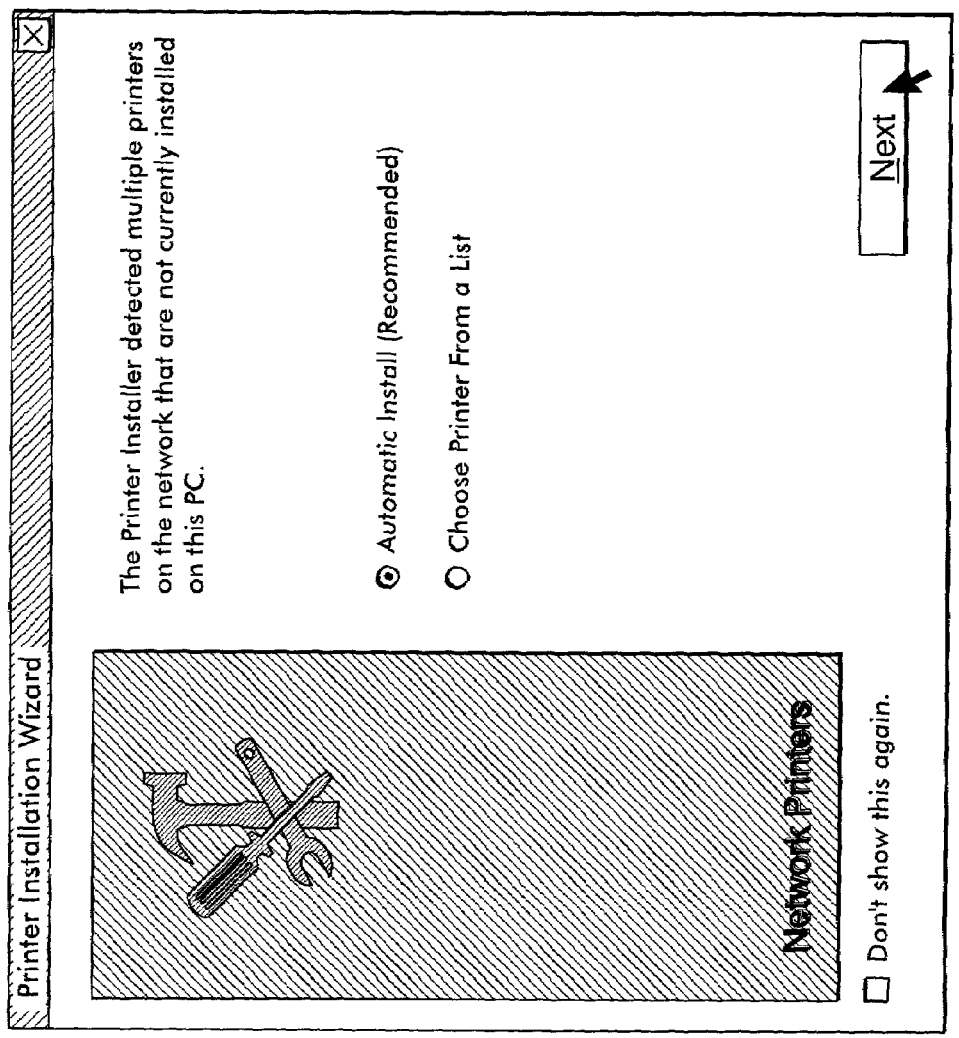
FIG. 7 is a screen shot of a dialog box which appears when a user first runs an installer.
Figure 8:
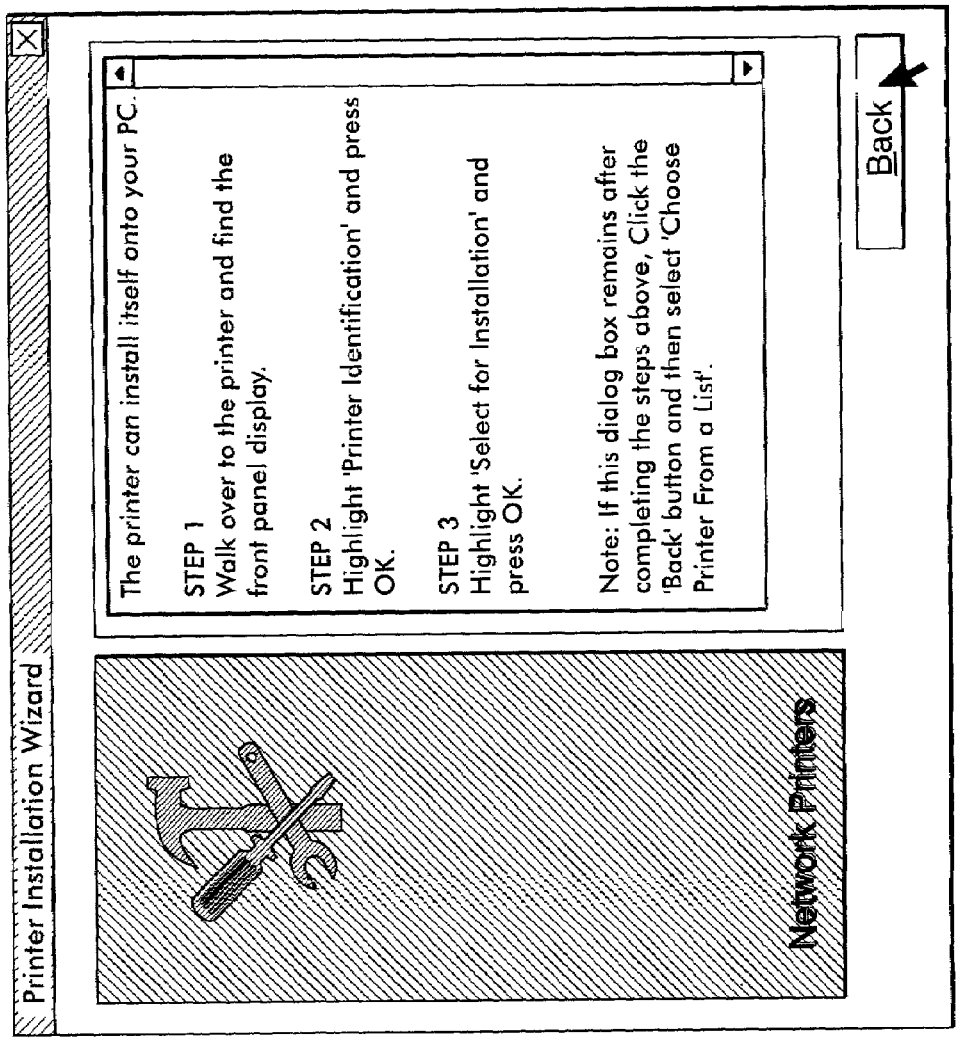
FIG. 8 is a screen shot which appears after a user selects <Next> on the screen shot of FIG. 7.

Referring to FIG. 6, a user executes a printer installer program from a location on a storage media (such as a CD or hard drive on the host device itself) or from a location in the Internet or from a printer's embedded web server by means of opening any standard browser, such as Internet Explorer or Netscape, on host device 210. If accessed from a printer' web page, it may not necessarily be the web page of the printer the user wishes to install. In this embodiment of the invention, the user does not need to know network address or location of the printer it wishes to install. The user browses to a web page of a printer on the network 200, which contains a printer installer. The web page may be provided by any of printers 220, 222, 224, 226, or 230. The printer's web page includes a link to an installer, which the user then executes on host device 210. After the installer begins executing, the installer displays the dialog box shown in FIG. 7, which indicates the installer has found multiple printers on the network that are not currently installed on the user's host device 210. This dialog box prompts the user to select automatic install. When the user selects the <Next> link in FIG. 7, the installer displays the dialog box shown in FIG. 8. The installer also causes host device 210 to begin listening on the network for a printer beacon broadcast packet.

Host device 210 begins monitoring its network connection for a period of time waiting for a packet of data containing certain printer identification information. This identification information may be the model name and distinguishing network information for the printer. It may also be the printer's IP address and configuration data needed to install the printer. If the installer can install more than one type of printer, the model information and other configuration information may be needed to determine which driver should be installed. Once the packet is received, the host machine 210 knows precisely which printer sent it, and can do anything it wishes with it, such as installing the printer 230.

Printer 230 includes beacon technology which broadcasts certain identification information on the network in response to appropriate selections on the printer's panel menu. When the user follows the instructions provided, this feature is activated, and the printer 230 will attempt to communicate with the host device 210. Referring the FIG. 8, the user 250 is prompted to walk over the printer the user wants to install (in this case, the user 250 wants to install printer 230), highlight the "Printer Identification" selection on the printer's menu and press "OK" and highlight the "Select for Installation" and press "OK". These steps activate the beacon on printer 230. When the user walks over to printer 230, the user activates printer 230's display panel menu and activates the special menu items.

When the beacon is activated, the beacon (which may be implemented in printer 230's firmware) then broadcasts a communication packet containing whatever predetermined information has been stored for broadcasting. This communication packet contains a special packet of data that the host machine 210 is listening for. This packet contains enough distinguishing information such that the host machine knows which printer sent it. The listening host device 210 receives this packet and then the host machine uses this information and installs the driver. The data packet broadcast by the beacon may contain the IP address of the printer. Once the packet is received, the host machine 210 may do whatever it needs to do with the information, such as contacting the printer directly over the network using the network protocol, such as TCP/IP and installing the printer driver. A specific printer was chosen at this point by the user, removing any ambiguity there may have been in the list of possible printers to work with.

The communication packet may be broadcast over the entire network. Alternatively, if the printer is located on a subnet on the network, the beacon broadcasts the communication packet to all listeners on the printer's subnet and to all listeners on any other subnets known to the printer.

Often the most confusing portion of installing a networked printer is deciding which printer to install when multiple printers are found. The system for installing a printer driver is a nearly fail-safe mechanism to accomplish this task. The user follows simple instructions and physically selects which printer the user wishes to install.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A system for installing a printer driver for a printer selected by a user as the printer the user wants to install, connected on a network, comprising:
    a printer driver for the user-selected printer, wherein the user-selected printer includes a display panel;
    a beacon, located at the user-selected printer, responsive to an input comprising the user accessing a menu on the user-selected printer's display panel and selecting a button on the menu for activating the beacon, for broadcasting the user-selected printer's identification on the network; and
    an installer, located on a user's host device connected on the network, for prompting the user to walk over to the user-selected printer and activate the beacon, and responsive to activation, for listening for the user-selected primer's identification, and responsive to receipt of the user-selected printer's identification, for installing the printer driver on the user's host device.

2. The system of claim 1, wherein the printer's identification comprises the printer's model name and distinguishing network information.

3. The system of claim 1, wherein the host device comprises a personal computer.

4. The system of claim 1, wherein the printer includes a web server, and responsive to the input, the beacon causes the web server to broadcast the printer's identification on the network.

5. The system of claim 1, wherein the printer's identification comprises a data packet including the printer's IP address on the network.

6. The system of claim 1, wherein the printer's identification comprises a data packet including the printer's network name on the network.

7. The system of claim 1, wherein the printer is located on a subnet on the network and wherein the beacon broadcasts the printer's model name and distinguishing network information to all listeners on the printer's subnet and to all listeners on any other subnets known to the printer.

8. The system of claim 1, wherein the installer is downloaded onto the host device from a storage location.

9. The system of claim 1, wherein the installer is downloaded onto the host device from a link in a web page generated by a web server on the network.

10. The system of claim 9, wherein the web server is resident on another printer on the network.

* * * * *